United States Patent [19]

Kaneda et al.

[11] Patent Number: 4,623,237
[45] Date of Patent: Nov. 18, 1986

[54] AUTOMATIC FOCUSING DEVICE

[75] Inventors: Naoya Kaneda; Youichi Iwasaki, both of Kanagawa; Masamichi Tohyama, Tokyo, all of Japan

[73] Assignee: Canon Kabushiki Kaisha, Tokyo, Japan

[21] Appl. No.: 752,170

[22] Filed: Jul. 3, 1985

[30] Foreign Application Priority Data

| Jul. 7, 1984 | [JP] | Japan | 59-139784 |
| Jul. 12, 1984 | [JP] | Japan | 59-143318 |
| Jul. 30, 1984 | [JP] | Japan | 59-157281 |
| Jul. 31, 1984 | [JP] | Japan | 59-159075 |

[51] Int. Cl.$^4$ .............................................. G03B 3/00
[52] U.S. Cl. ........................................ 354/403; 358/227
[58] Field of Search ................. 354/406, 403, 402; 356/1; 250/201 AF; 352/140; 358/227

[56] References Cited

U.S. PATENT DOCUMENTS

| 3,836,919 | 9/1974 | Matsumoto et al. | 354/403 |
| 3,906,389 | 9/1975 | Matsumoto et al. | 354/403 X |
| 4,257,705 | 3/1981 | Hosoe et al. | 356/1 |
| 4,268,137 | 5/1981 | Cocron et al. | 354/403 |
| 4,389,106 | 6/1983 | Maruyama | 354/403 |
| 4,429,967 | 2/1984 | Tokuda et al. | 354/403 |

Primary Examiner—William B. Perkey
Attorney, Agent, or Firm—Toren, McGeady, Stanger, Goldberg & Kiel

[57] ABSTRACT

An automatic focusing device having a light projecting device, a light receiving device arranged to detect a reflection light quantity reflected by an object to be photographed as a result of light projection by the light projecting device and a distance measuring device arranged to measure a distance to the object by the reflection light quantity received by the light receiving device is capable of adequately performing a focusing operation even in cases where the reflection light quantity is at a level too low for the distance measuring device to give any result of distance measurement. This advantage is attained by the following arrangement: (i) the automatic focusing device is provided with a current control device which is arranged to increase the power of a light flux to be emitted from the light projecting device; (ii) a lens driving operation is brought to a stop in the event of an object of a low reflection factor; (iii) the light quantity accumulating time of the light receiving means can be lengthened; or (iv) a comparison level can be lowered.

3 Claims, 27 Drawing Figures

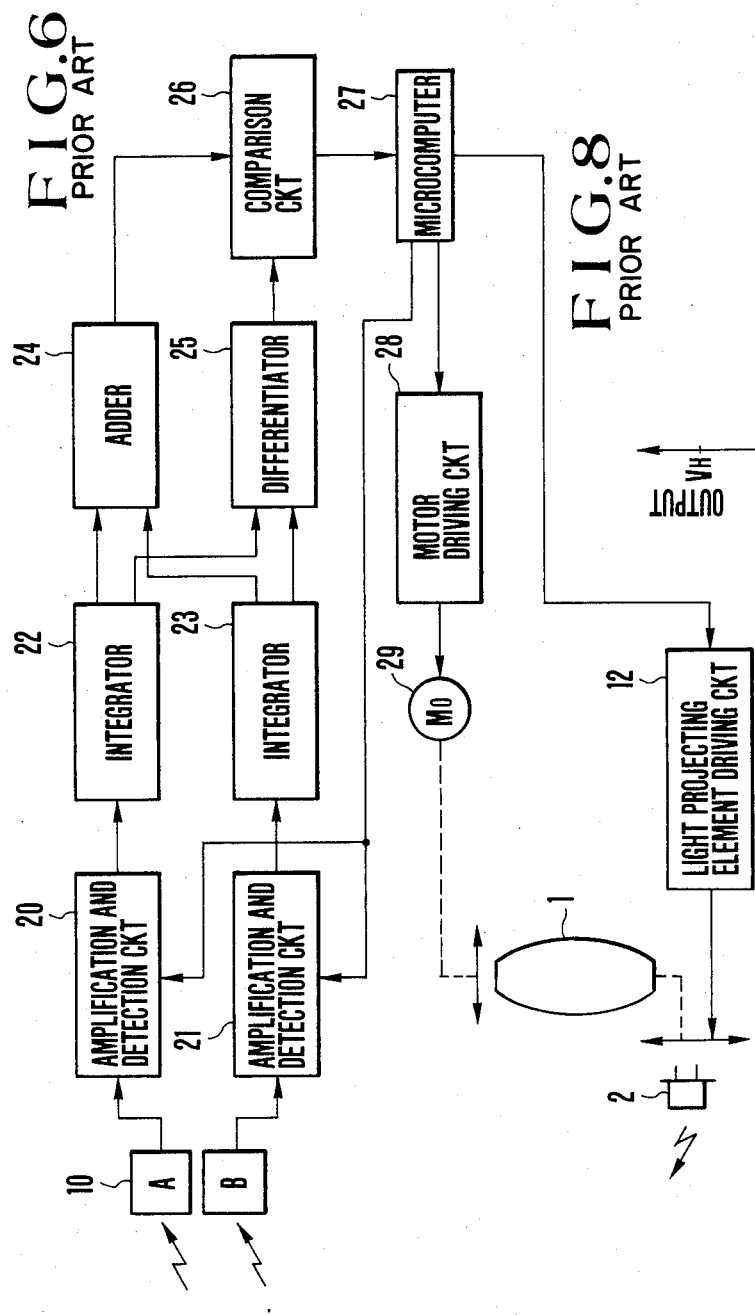

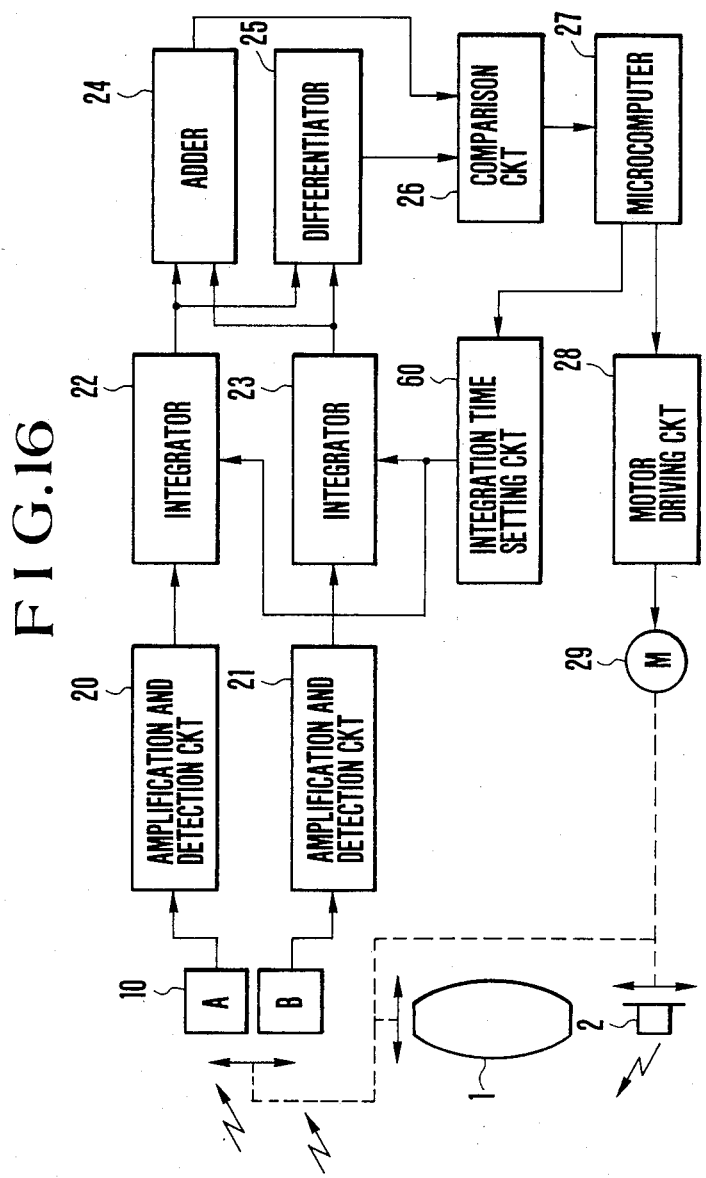
F I G. 16

AUTOMATIC FOCUSING DEVICE

BACKGROUND OF THE INVENTION

1. Field of the Invention

This invention relates to an automatic focusing device having a distance measuring device to be used for a camera or the like and, more particularly, to an automatic focusing device having an active type distance measuring device which is arranged to project a light flux onto an object to be photographed.

2. Description of the Prior Art

The conventional active type distance measuring devices used for automatic focusing devices to which this invention is suitably applicable can be divided into a peak detecting type and a differential type.

Referring to FIG. 1 of the accompanying drawings, the peak detecting type distance measuring device is arranged as follows: In association with the movement of a lens group 1 which participates in focal point adjustment among the lens elements of a photo-taking lens, a light projecting element 2 which is an IRED or the like is arranged to project near infrared rays via a light projection lens 3 toward a photo-taking object 4 in such a way as to scan the object with a projected light spot image 7 until it comes to a position 7' by continuously moving the light projecting element 2 to a position 2'. Then, the reflection light of the projected light is received via a light receiving lens 5 by a light receiving element 6 which is an SPC or the like. With the reflection light thus detected by the light receiving element 6, the lens group 1 is stopped from moving. Assuming that an image 8 of the light receiving element 6 which is projected on the object 4 by the light receiving lens 5 is formed at a point 8, an electrical output occur when the projected light spot image 7 begins to overlap the projected image 8 of the light receiving element 6 on the object 4. Then, the relation between this electrical output and a scanning angle Θ of the light projecting element 2 presents a characteristic as shown in FIG. 2. A distance to the object 4 from the distance measuring device or the camera is obtained, according to the principle of the trigonometric distance measurement, from the scanning angle Θ1 of the light projecting element 2 obtained when the electrical output reaches its peak value and also from the distance between the light projecting lens 3 and the light receiving lens 5.

As to the differential type distance measuring device, the devices of this type have been disclosed in Japanese Patent Publication No. SHO 56-54610 (corresponding to United Kingdom Pat. No. GB 2019152B), Japanese Patent Publication No. SHO 59-809 (United Kingdom Pat. No. GB 2027313B), etc. In addition to them, a previous U.S. patent application Ser. No. 603,660, filed Apr. 26, 1984 with some of the coinventors of the present invention participating therein also discloses a device of this type. Referring to FIG. 3, the operating principle of the differential type is as follows: A light receiving element 10 is divided into two areas A and B. Distance measurement is carried out by a difference between signals obtained from these two areas A and B. An image 11 of the light receiving element 10 which is projected on a photo-taking object 4 by a light receiving lens 5 is also divided into areas 11A and 11B. In the case of this type, the scanning position of the light projecting element 2 is related to the moving position of a lens group 1 which participates in focal point adjustment In the event that the in-focus distance of the lens is nearer than the distance to the object 4, as indicated by a one-dot-chain line 1', the projected light spot image of the light projecting element 2 is in a position I which is located more on the side of lower area 11A relative to the middle border line between the areas 11A and 11B as viewed on the drawing. Conversely, when the in-focus distance of the lens is farther than the object distance as indicated by another one-dot-chain line 1'', the projected light spot image of the light projecting element 2 is in another position III which is located more on the side of the higher area 11B relative to the border line. In this instance, assuming that the outputs from the two areas A and B of the light receiving element 10 are $V_A$ and $V_B$, the device is arranged to have them in a relation of $V_A > V_B$ when the lens is in a near-focus state, in a relation of $V_A < V_B$ in the event of a far-focus state and in a relation of $V_A = V_B$ with the lens in an in-focus state. In an actual practical device, there is provided some additional arrangement such as a dead zone $V_D$ for removing a noise component of the output in such a manner that the lens is in an in-focus state when there obtain a relation of $|V_A - V_B| \leq V_D$, in a near-focus state when the relation is $V_A - V_B > V_D$, and in a far-focus state in the event of $V_A - V_B < -V_D$.

In the case of FIG. 3, the light projecting element 2 is arranged to perform a scanning operation in association with the movement of the lens group 1 while the light receiving element is arranged to be stationary. However, besides this arrangement, there have been known different arrangements wherein the light projecting element 2 is arranged to be stationary while the light receiving element 10 is arranged to perform a scanning operation in association with the lens group 1; or wherein, for the purpose of always measuring the distance of the middle part of a photographing picture to avoid a parallax, both the light receiving and light projecting elements are arranged to perform scanning in association with the movement of the photo-taking lens.

For determining the in-focus, near-focus or far-focus state as mentioned above, there have been proposed various methods. An example of these methods is as shown in FIG. 4. In this method, weak signals obtained from the areas A and B of the light receiving element 10 are respectively subjected to amplifying, detecting and integrating processes before they are produced as outputs $V_A$ and $V_B$. The outputs $V_A$ and $V_B$ which correspond to the positions I, II and III shown in FIG. 3 are respectively indicated as $V_{AI}$, $V_{BI}$, $V_{AII}$, $V_{BII}$, $V_{AIII}$ and $V_{BIII}$. In this instance, the outputs $V_A$ and $V_B$ are compared with a predetermined level $V_H$. When either one of the outputs $V_A$ and $V_B$ reaches the level $V_H$, the value of the other output is detected. Then, the lens is determined to be in focus when a difference between the two outputs $V_A$ and $V_B$ is less than a predetermined level and to be out of focus when the difference is above the predetermined level.

Another example of the determining methods of the prior art is as shown in FIG. 5. The most salient difference of this method from that of FIG. 4 resides in that: Instead of comparing the outputs $V_A$ and $V_B$ with a predetermined level, the values of $|V_A - V_B|$ and $V_A + V_B$ are obtained and the values thus obtained are compared with predetermined levels. More specifically, an in-focus state is considered to have been attained when the value $|V_A - V_B|$ is below a predetermined level $V_D$ while the value $V_A + V_B$ has reached a predetermined level VH. When the value |VA−VB| reaches the predetermined level VD before the value VA+VB reaches the predetermined level VH, the lens is determined to be out of focus.

FIG. 6 shows in a block diagram an automatic focusing device of the differential type employing the determining method of FIG. 5. When a start switch, which is not shown, is turned on, a microcomputer 27 supplies a light projecting element driving circuit 12 with a synchronizing signal which determines a light emission period. The circuit 12 then causes a light projecting element 2 to emit a pulse light toward an object to be photographed. The object reflects the light. The reflected light is received by a light receiving element 10 which is divided into areas A and B. The areas A and B then produce outputs which are respectively amplified and detected by amplification-and-detection circuits 20 and 21 according to a synchronizing signal which is supplied from the microcomputer 27 for synchronous detection. After that, these outputs are integrated by integrators 22 and 23. Integrated outputs VA and VB are computed by an adder 24 and a differentiator 25 to obtain values VA+VB and |VA−VB| respectively. These values are compared at a comparison circuit 26 with predetermined level values VH and VD respectively. The microcomputer 27 then determines a near-focus state, a far-focus state or an in-focus state of the basis of the result of the comparison. The microcomputer instructs a motor driving circuit 28 according to the result of determination. The motor driving circuit 28 drives a motor 29 to move a lens group 1. The movement of the lens group 1 then causes, via a cam or the like, the light projecting element 2 to perform scanning. Then, a distance measuring operation comes to an end.

FIGS. 19 to 27 show the details of the amplification-and-detection circuits 20 and 21, the integrators 22 and 23, the adder 24, the differentiator 25, the comparison circuit 26 and the microcomputer 27. Referring to FIGS. 19 to 27, the details of these circuits are as described below:

The electrical circuit arrangement of the device described above is as shown in FIG. 19. The reflected light spot image received at the areas A and B of the light receiving element 10 as mentioned in the foregoing is photoelectric converted into light information signals. The light information signals thus obtained are supplied to and sufficiently amplified by amplification circuits 20a and 21a. The amplifiers 20a and 21a are preferably arranged to have sufficient amplification degrees for the infrared rays forming the projected light spot image and to have a frequency characteristic suppressing as much as possible the amplification degree for the frequency of such modulating light as unnecessary sunlight or commercial light sources. The outputs of these amplifiers are applied to synchronous detection circuits 20b and 21b and are subjected to synchronous detection. In this instance, the synchronizing signal is of the same frequency as that of a light emission driving signal for the light projecting element 2 and is in a predetermined phase relation thereto. The outputs of the synchronous detection circuits are integrated by integrators 22 and 23 and increase every moment at a rate proportional to the signal intensity of the reflected light spot image. The integrated voltages VA and VB which are thus obtained separately from the integrators 22 and 23 through the above-stated signal processing operation are processed and determined by a computing circuit which will be described later herein and are thus converted into digital information signals consisting of some bits.

More specifically stated, the integrated voltages VA and VB are made into a difference signal VA−VB by means of a subtracter 25a and into a sum signal VA+VB by means of an adder 24. The difference signal VA−VB is applied to an absolute value circuit 25b to obtain a signal |VA−VB|. The value of this signal |VA−VB| is compared at a comparator 26a with a comparison value VD and the result of comparison is produced from the comparator 26a. The sum signal VA+VB is compared respectively at level detecting comparators 26b and 26c with comparison values VL and VH and the results of comparison are produced from these comparators 26b and 26c. Meanwhile, the integrated voltages VA and VB are compared as they are at another comparator 26d. The four digital information signals which are thus obtained including the outputs DD, LL, HH and AB of the comparators 26a, 26b, 26c and 26d are supplied to a sequence control circuit 27 and the operation of the whole system is determined there.

A light projecting element driving circuit 12 is arranged to supply a current to the light projecting element 2 in synchronism with a synchronizing signal from the control circuit 27 and controls light emission from the light projecting element 2.

A motor driving circuit 28 is arranged to control the direction are speed of rotation of a photo-taking optical system driving motor 29 in accordance with a signal coming from the control circuit 27. FIG. 20 more specifically shows the circuit arrangement of a part C shown in FIG. 19.

Referring to FIG. 20, in the part C of the circuit of FIG. 19, low-noise operational amplifiers 201a and 201b are disposed at the initial stages of the amplifiers 20a and 21a. Feedback circuits 202a and 202b are arranged to give a by-pass characteristic. Some portion of the energy of the infrared rays projected from the light projecting element 2 is reflected and returned back to the light receiving element 10 together with some external light component. It is likely that this external light component may be of a large value compared with the returned energy. In combination with the use of a visible light cutting filter FL, these feedback circuits 202a and 202b serve to relatively suppress the external light component. These circuits can be so arranged as to be practicable to obtain the suppressing effect under most of object conditions. Further, the DC component due to sunlight, etc. is almost completely cut by means of capacitors 203a and 203b. AC amplifiers 204a and 204b are arranged to sufficiently amplify the components in the proximity of modulation frequency before the signals are supplied to the synchronous detection circuits disposed at the next stage. The synchronous detection circuits 20b and 21b shown in FIG. 19 are composed of inverters 205a and 205b, analog switches 206a and 206b and other analog switches 207a and 207b. The analog switches 206a, 206b, 207a and 207b are operated by means of a synchronizing signal SYNC to alternately select non-inverted signals and inverted signals.

In another example, a method of obtaining the product of the input signal and the AC component of the synchronizing signal SYNC by means of a four-phenomenon analog multiplier may be employed in place of the above arrangement.

The synchronously detected signals become direct currents (pulsating currents) and are supplied to the integrators 22 and 23 of the next stage.

Each of the integrators 22 and 23, consists of an operational amplifier 208a or 208b and a capacitor 210a or 210b. Currents which are proportional to the voltages of the synchronous detection outputs flow via resistors 209a and 209b to the capacitors 210a and 210b to be stored there. Then, these currents become integrated voltages and are produced from the operational amplifiers 208a and 208b. These voltages correspond to the voltages VA and VB mentioned in the foregoing. Analog switches 211a and 211b are arranged to make the electric charges stored at the capacitors 210a and 210b into their initial states. These electric charges stored at the capacitors 210a and 210b are thus cleared in response to a clear signal CLR from the control circuit 27 for a next electric charge storing process.

FIG. 21 shows in more detail the part D of the circuit of FIG. 19 wherein the integrated voltages VA and VB are processed to obtain a signal $|VA-VB|$ which is compared with the comparison voltage VD. The integrated voltages VA and VB produced from the integrators 22 and 23 are subjected to a subtraction process at a subtraction circuit 25a consisting of resistors 213−216 each of which is of the same resistance value R as an operational amplifier 212. A signal $-VA+VB$ is obtained through this process. This value signal is applied to the absolute value circuit 25b of the next stage. The absolute value circuit 25b consists of an operational amplifier 217, diodes 218 and 219, resistors 220, 221 and 222 which are of a resistance value 2 R and another resistor 223 which is of a resistance value R. The operational amplifier 217, diodes 218 and 219 and resistors 220 and 221 are so arranged that the cathode of the diode 219 comes to have a high impedance upon receipt of a negative input and to have a potential which is −1 times as high as an input voltage upon receipt of a positive input. As a result, a voltage of value $-0.5 |VA-VB|$ is applied to the negative input terminal of a comparator 224. With a voltage of value $-0.5$ VD having been applied to the positive input terminal of the comparator 224 beforehand, the value $|VA-VB|$ and the value VD are compared with each other. Let us assume that a value obtained as the result of this comparison is DD.

FIG. 22 shows in more detail the part E of the circuit of FIG. 19. The integrated voltages VA and VB are added up by resistors 225 and 226 of a resistance value R and a signal of a value 0.5 (VA+VB) is applied to each of the positive input terminals of comparators 227 and 228. Meanwhile, the negative input terminal of each of these comparators 227 and 228 has a signal of value 0.5 VL or 0.5 VH applied thereto. These comparators thus compare the value (VA+VB) with the values VL and VH and produce comparison outputs of values LL and HH respectively.

FIG. 23 shows in more detail the part F of the circuit of FIG. 19. In this part, the integrated voltages VA and VB are directly compared with each other by means of a comparator 229, which then produces a comparison output of a value AB.

FIG. 24 shows by way of example another method for obtaining the comparison value DD from the integrated voltages VA and VB. In this case, the voltages VA and VB are applied to the positive input terminals of comparators 230 and 231 and are further applied via resistors 232 and 233 of a resistance value R to the negative input terminals of these comparators 230 and 231. Meanwhile, these negative input terminals are also connected to constant current sources 234 and 235. Such being the arrangement, these negative input terminals have voltages VB+iR and VA+iR applied thereto respectively. (NOTE "i" represents the current value of the constant current sources 234 and 235). The outputs of the comparators 230 and 231 are supplied to an OR circuit 236 which then produces the output (or the comparison value ) DD. This output DD becomes true logic in case of $VA-VB>iR=VD$ or $VB-VA>iR=VD$ and represents logic in the event of $|VA-VB|>VD$.

FIG. 25 shows a case where a part of the sequence control circuit 27 is embodied by hardware means. A clock CL is arranged to determine the minimum period of the sequence control circuit 27 and serves as source of a signal for modulation of light emission of the light projecting element 2 and the synchronizing signal SYNC for the synchronous detection circuits 20b and 21b. A counter 236 is arranged to count an n-number and to produce an output Cn which determines the period and the maximum integration time for distance measurement. Flip-flops 237 and 238 are arranged to be set respectively by the signals DD and HH and to be reset by the signal Cn at every period of distance measurement. The outputs DDQ and HHQ of the flip-flops 237 and 238 are integration terminating signals. These signals DDQ and HHQ are supplied via an OR circuit 239 to a flip-flop 240 to be held there according to the period of the signal Cn. The inversion output $\bar{Q}$ of the flip-flop 240 becomes an infinity signal FAR. The signals FAR and DDQ come via an OR circuit 241 to set a flip-flop 242, which then produces a motor rotation signal MO. This flip-flop 242 is also arranged to be reset by the integration terminating or in-focus signal HHQ. When there obtains an in-focus state, the motor rotation signal MO is inhibited from being produced and the motor 29 is thus brought to a stop. The signal AB is renewed into a signal ABQ at a flip-flop 243 by the signal DDQ which represents an out-of-focus state. In this instance, the signal AB becomes true logic in the event of a near-focus state, i.e. in the case of VA>VB. The signals ABQ and FAR become a signal FN indicative of the rotating direction of the motor via an OR circuit 244. A final motor driving signal FF (in the direction of an infinity distance position) or NN (in the direction of a nearest distance position) is selected according to the output of an AND circuit 245 which received the signals FN and MO or the output of an AND circuit 247 which receives the signal FN via a NOT circuit 246 and the signal MO.

In case that both the signals DDQ and HHQ are of false logic and are supplied via the OR circuit 239 and NOT circuit 248 to an AND circuit 249, the synchronizing signal SYNC is produced in synchronism with the output CLK of the clock CL which is supplied to the AND circuit 249 in that case. An integration resetting signal CLR produced from an OR circuit 250 becomes true logic and so remains until resumption of a next integrating process after termination of integration is decided jointly by the output of the OR circuit 239 and the signal Cn supplied to the OR circuit 250.

FIG. 26 shows wave forms of signals of FIG. 25 observed when focused state changes as follows: A near-focus state→a far-focus state→an in-focus state-→an infinity distance state. In the event of a near-focus state, the signal DD first rises. At this instant, the signal AB is at a high level. In the event of a far-focus state, the signal DD also first rises while the signal AB is at a low level. In case of an in-focus state, the signal HH rises. In case of an infinity distance state, the end of a maximum integration time comes before none of the signals come to rise.

FIG. 27 shows an example wherein a microcomputer is used for the sequence control circuit 27 to accomplish control with soft-ware arrangement employed in a part of the device according to the invention. In this drawing are also shown by way of example a light projecting element driving circuit 12 for the light projecting element 2 and a motor driving circuit 28. A reference numeral 251 denotes the microcomputer. (The microcomputer may be selected from commercially available products such as a model NO. MN 1453AX manufactured by Matsushita Electronics Industries Co., Ltd.) The input terminals of the microcomputer 251 receive the above-stated signals DD, AB, LL and HH. From the output terminals of the microcomputer 251 are produced the signals SYNC, CLR, FF and NN. Further, a signal LOW for the motor rotation speed control, etc. can be readily added to these signals.

In the case of an active type distance measuring device which is arranged as described in the foregoing, the in-focus determination is made according to a reflection light resulting from a projected light. In cases where the reflection factor of the object is low or where the object distance is far, therefore, the reflection light cannot be received in sufficient intensity or quantity. It has been therefore impossible in such cases to perform distance measurement. In these cases, the insufficient reflection light component of a signal thus obtained results in deterioration of the S/N ratio of the signal. In the case of the peak detecting type distance measuring device which is arranged as shown in FIGS. 1 and 2, the output signal thus obtained becomes as shown in a graph "a" in FIG. 7 and does not clearly show a peak. In the case of the differential type which is arranged as shown in FIGS. 3 to 6, the value VA+AB remains below the value or level VH and the value |VA−VB| below the value or level VD even after the lapse of a maximum integration time T0. In that instance, the output signal is considered to be in a state as shown in FIG. 8. Again referring to FIGS. 7 and 8, a level VT which is shown in these drawings is set with a noise, etc. taken into consideration. When a peak value detected by the peak detecting type device is below the level VT, the peak value is not considered to be a peak value. In the case of the differential type device also, when a value ½ (VA+VB) is below the level VT after the lapse of the maximum integration time T0, the object is determined to be located at a far distance. Further, in case of a differential type device arranged to perform the determining operation according to the method of FIG. 5, the above-stated set level may be considered to be VT=(VH)/2.

Heretofore, in the event of a low level of the reflection light as mentioned above, the majority of the active type automatic focusing devices of the kind described are arranged to have the lens stopped in an infinity distance focusing position, a hyper focal distance focusing position or the like. However, in the event of the insufficient reflection light component as mentioned above, the arrangement to bring the lens in the infinity distance focusing position or the like has fialed to give an adequate image for an object which is of a low reflection factor and is located at a near distance.

SUMMARY OF THE INVENTION

A first object of the present invention is to provide an automatic focusing device which is provided with light projecting means, light receiving means for detecting the quantity of light reflected by an object to be photographed as a result of a light projection performed by the light projecting means and a distance measuring device for performing destance measurement according to the reflected light received by the light receiving means; said device being further provided with current control means arranged to increase the power of rays of light emitted by the light projecting means in cases where the level of the reflected light quantity is insufficient for obtaining any adequate result of distance measurement by the distance measuring device.

A second object of this invention is to provide a differential and active type automatic focusing device which is arranged to measure a distance for focal point adjustment by projecting rays of light from a light projecting element to an object to be photographed and by receiving a reflection light resulting from the light projection by means of a light receiving element which is divided into two light receiving areas, said device being provided with comparison level setting means which is arranged to lower a comparison level in cases where the reflection light is at a level too low for distance measurement.

A third object of this invention is to provide an automatic focusing device wherein, in cases where the above stated reflection light is at a level of light quantity too low for obtaining any adequate result of distance measurement, the power of light to be emitted from the light projecting element is increased; and a driving operation on a focusing lens is arranged to be brought to a stop when an object to be photographed is determined to be of a low reflection factor.

A further object of the invention is to provide an automatic focusing device which is provided with integration time setting means arranged to lengthen an integration time in cases where the level of the above-stated reflection light is too low for carrying out distance measurement.

These and further objects and features of the invention will become apparent from the following detailed description of embodiments thereof taken in connection with the accompanying drawings.

BRIEF DESCRIPTION OF THE DRAWINGS

FIG. 6 is a block diagram showing a distance measuring device arranged to operate according to the in-focus determining method of FIG. 5.

FIG. 8 is a graph showing an output characteristic obtained when the reflection light component of a differential type distance measuring device is insufficient.

FIG. 16, 17 and 18 show an automatic focusing device provided with means for lengthening or extending an integration time according to the invention in cases where the level of a reflection light is too low for carrying out distance measurement, FIG. 16 being a block diagram, FIG. 17 a flow chart and FIG. 18 a graph showing the in-focus determining operation of the device.

DETAILED DESCRIPTION OF THE PREFERRED EMBODIMENTS

Figure 9:
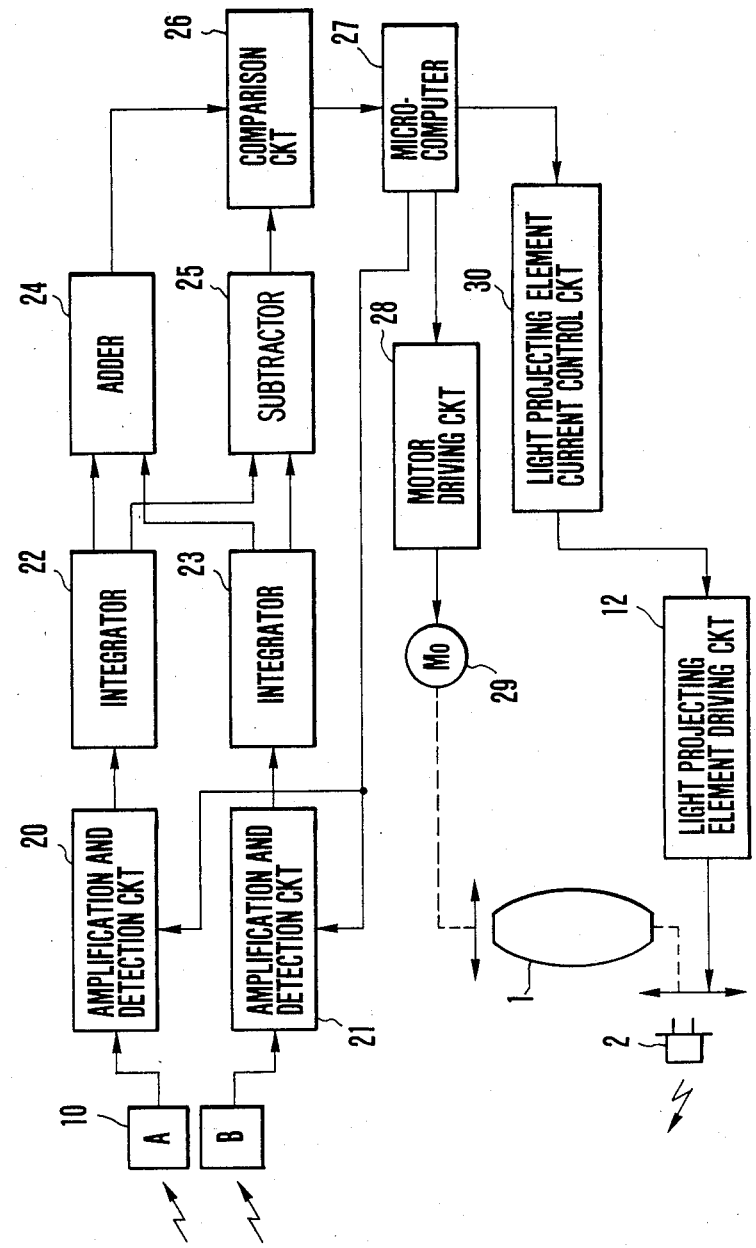
FIG. 9 is a block diagram showing, as an embodiment of this invention, an automatic focusing device provided with current control means which is arranged to increase the power of a light projecting means.

Embodiments of this invention are arranged as described hereinafter with reference to the accompanying drawings: FIG. 9 shows in a block diagram an automatic focusing device which embodies the invention and is provided with a differential, active type distance measuring device shown in FIG. 6. FIG. 9 uses the same reference numerals for showing the same parts as those shown in other drawings. In the embodiment, the light projecting element 2 is caused via a cam or the like to perform scanning in association with the movement of a focusing lens group 1. The microcomputer 27 is arranged to supply a synchronizing signal for determining light emitting period to the light projecting element driving circuit 12 via a light projecting element current control circuit 30 which is arranged to control the light emitting power of the light projecting element 2. Upon receipt of the synchronizing signal, the driving circuit 12 causes the light projecting element 2 to perform pulse light emission.

The light receiving element 10 which is arranged to receive a reflection light resulting from light projection by the light projecting element 2 is divided into two areas A and B. The outputs produced from these areas A and B are respectively subjected to amplification and detection processes performed by the amplification-and-detection circuits 20 and 21 and are then integrated by the integrators 22 and 23. Outputs VA and VB are thus obtained. The outputs VA and VB are then subjected to computing operations performed by the adder 24 and the differentiator 25 to obtain values VA+VB and |VA−VB|, which are then supplied to the comparison circuit 26 to be compared with set levels VH and VD respectively. The results of comparison are supplied to the microcomputer 27. The microcomputer 27 then determines a near-focus state, a far-focus state or an in-focus state. An instruction according to the result of determination is supplied to the motor driving circuit 28. The circuit 28 drives the motor 28 to move the focusing lens group 1 accordingly. This causes the light projecting element 2 to perform scanning for distance measurement and focal point adjustment.

Figure 1:
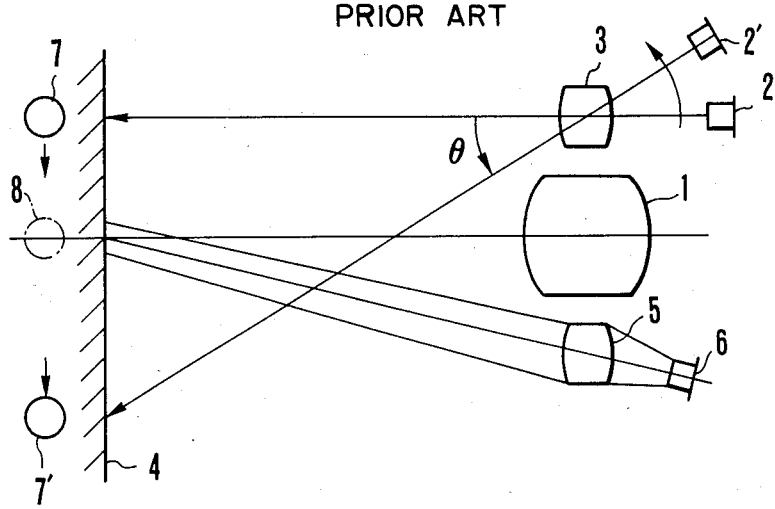
FIG. 1 shows the arrangement of the conventional peak detecting, active type distance measuring device.
Figure 2:
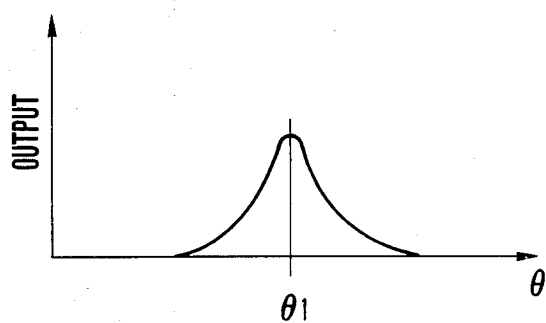
FIG. 2 is a graph showing the output characteristic of the same device.
Figure 7:
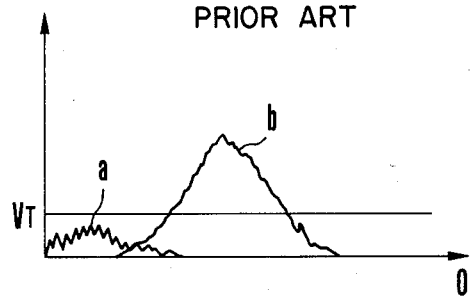
FIG. 7 is a graph showing an output characteristic obtained when the reflection light component of the device of FIG. 1 is insufficient.
Figure 3:
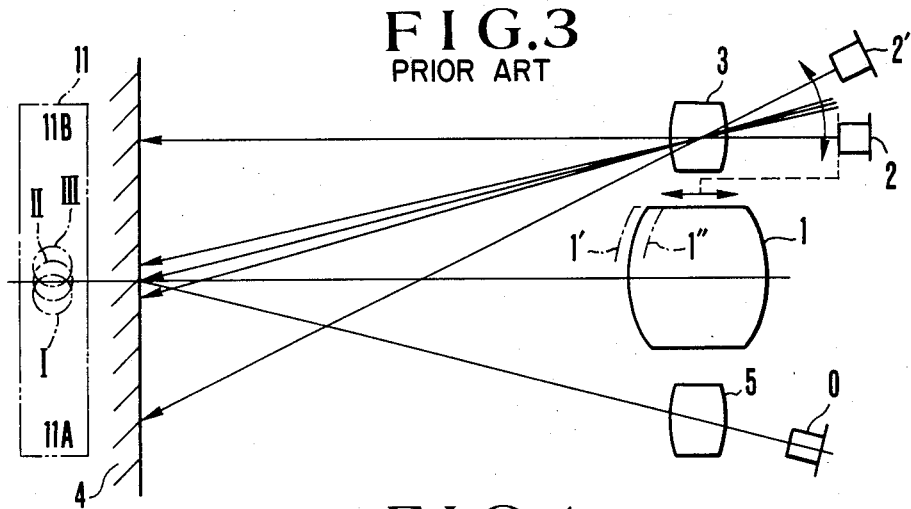
FIG. 3 shows the arrangement of the conventional differential, active type distance measuring device.
Figure 4:
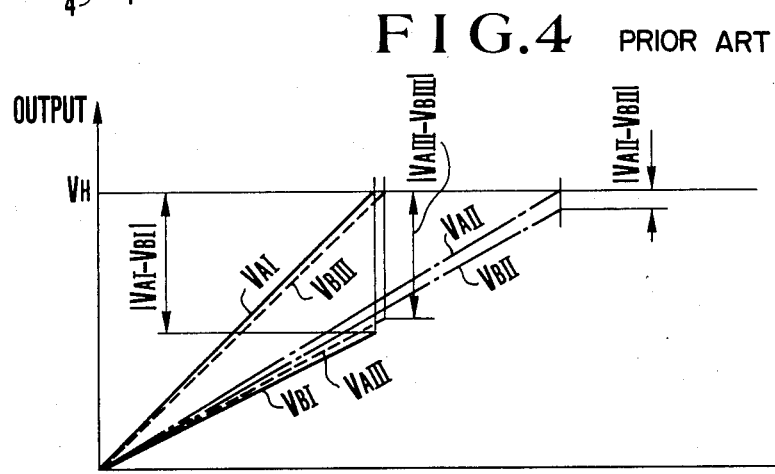
FIG. 4 shows the operation characteristic of an in-focus determining method employed in the device shown in FIG. 3.
Figure 5:
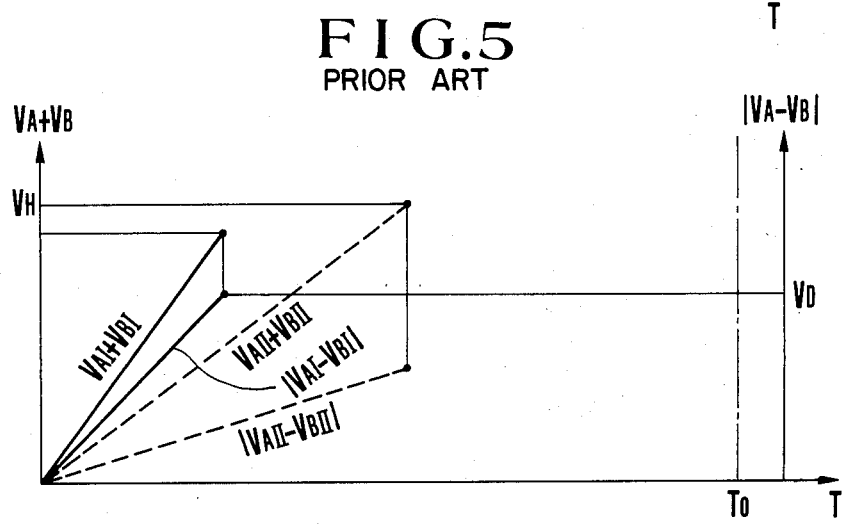
FIG. 5 shows the operation characteristic of another in-focus determining method employable for the device shown in FIG. 3.
Figure 10:
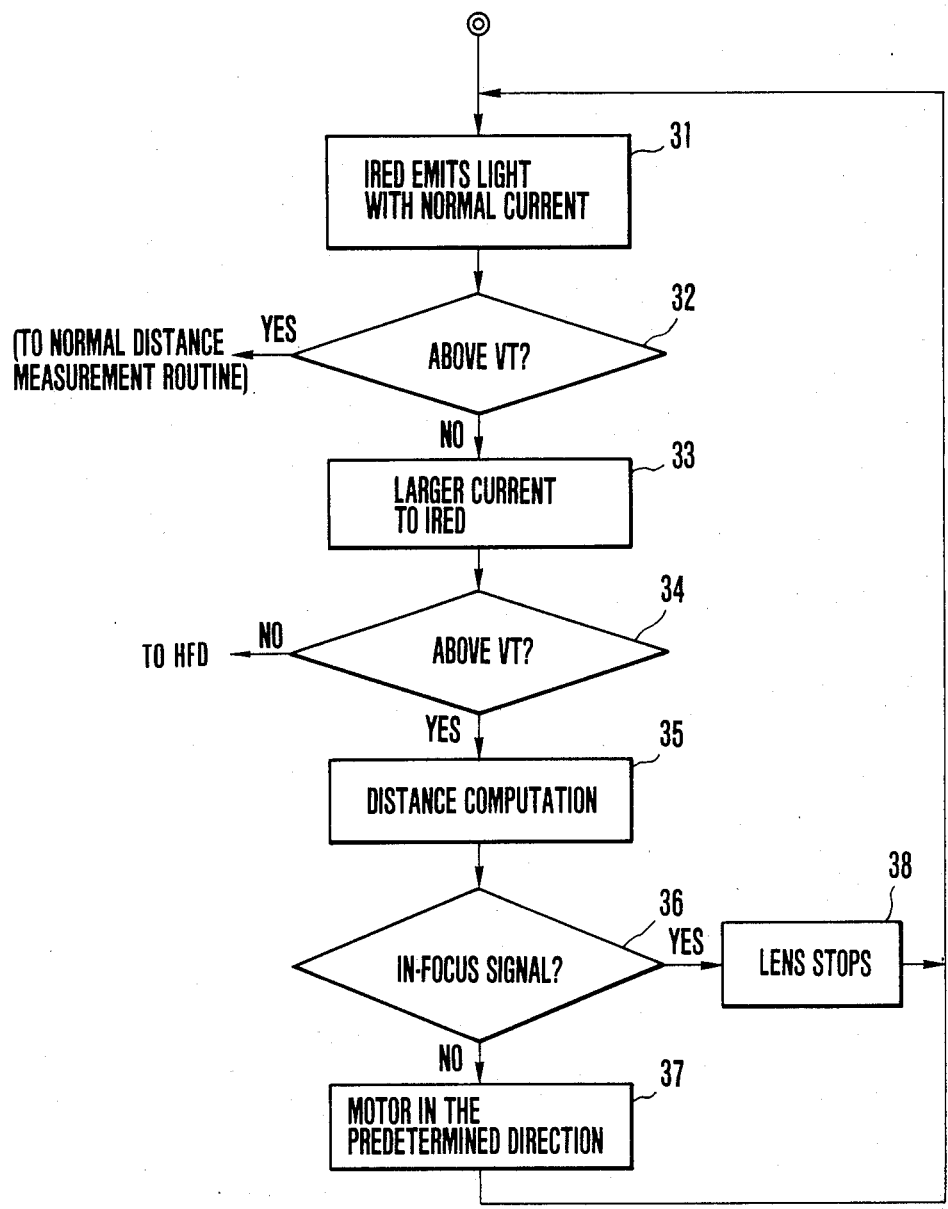
FIG. 10 is a flow chart showing the operation of the device of FIG. 9.

FIG. 10 shows in a flow chart the above stated control operation of this embodiment. Referring to FIG. 10, a reference symbol VT denotes a comparison level which is conventionally used for determining an infinity distance focusing position. This comparison level VT corresponds, for example, to the comparison level VH which is compared with the output value VA+VB in the case of the method shown in FIG. 5. At a step 31, the light projecting element 2 is allowed to emit light at an ordinary current value to project the light onto an object to be photographed. At a step 32, a reflection light coming from the object as a result of the light projection is received by the light receiving element 10. Then, after the lapse of the maximum integration time T0 which is shown in FIG. 5, it is determined whether or not the output value VA+VB has reached the level VT (or VH). In accordance with the conventional arrangement, if the result of this determination is NO, the focusing lens group 1 of the photo taking lens is shifted to a hyper focal distance (HFD) in-focus equivalent position. Whereas, in the case of this embodiment, the current which is used for lighting up the light projecting element 2 is increased in such a way as to increase the power of light to be projected on the object (a step 33). After the step 33, the output value VA+VB is again compared with the comparison level VT at a step 34. If the result of this comparison is NO, the lens group 1 is stopped at the hyper focal distance in-focus equivalent position. If, in this instance, the reflection light comes to be received in a sufficient quantity for distance measurement and the result of comparison is YES, in-focus or out-of-focus determination is performed at a step 36. Then, in the event of NO which means determination of a near-focus or far-focus state, motor driving control is performed at a step 37. In the case of YES which means determination as an in-focus state, the lens group 1 is kept at the stopped position at a step 38. As regards the sequence of operation after increasing the current supply to IRED (the light projecting element), if the current supply to the IRED is allowed to be effected continuously at the increase value, it would present a problem in terms of power consumption. In view of this problem, it is preferable to make some arrangement such as to lengthen distance measuring intervals or the like, because it is hardly possible, at a normal current value, to obtain any result of determination other than setting the lens group 1 in the hyper focal distance focusing position.

With the automatic focusing device having the active destance measuring device arranged as described above, the problem of having a blurred image of a low reflection factor object which has heretofore resulted from merely determining the object to be located at a hyper focal distance can be solved by the invented arrangement to increase the current supply to the light projecting element. The embodiment thus enhances the accuracy of distance measurement.

Figure 11:
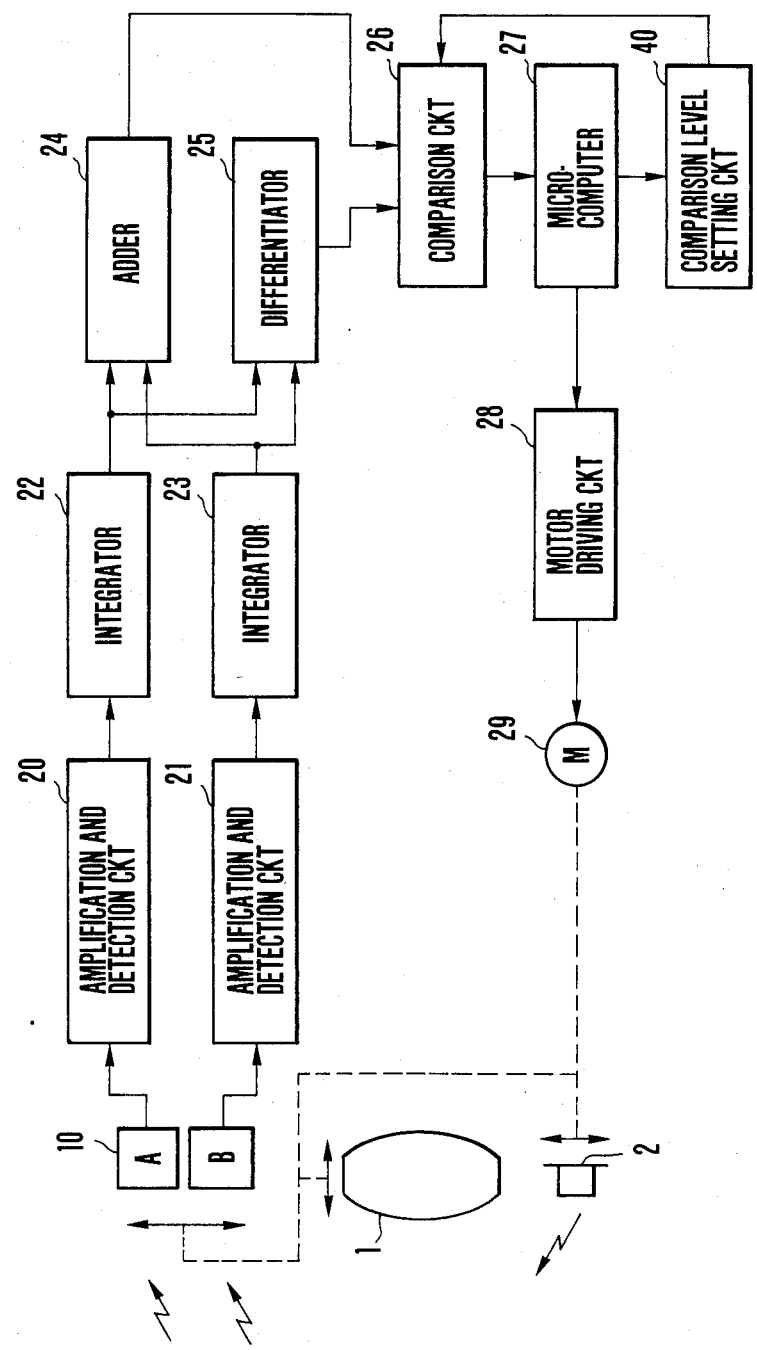
FIGS. 11, 12 and 13 show, as another embodiment, an automatic focusing device provided with comparison level setting means which is arranged to lower a comparison level in cases where the level of a reflection light is too low for carrying out distance measurement, FIG. 11 being a block diagram, FIG. 12 being a flow chart and FIG. 13 being a graph showing an in-focus determining operation.
Figure 12:
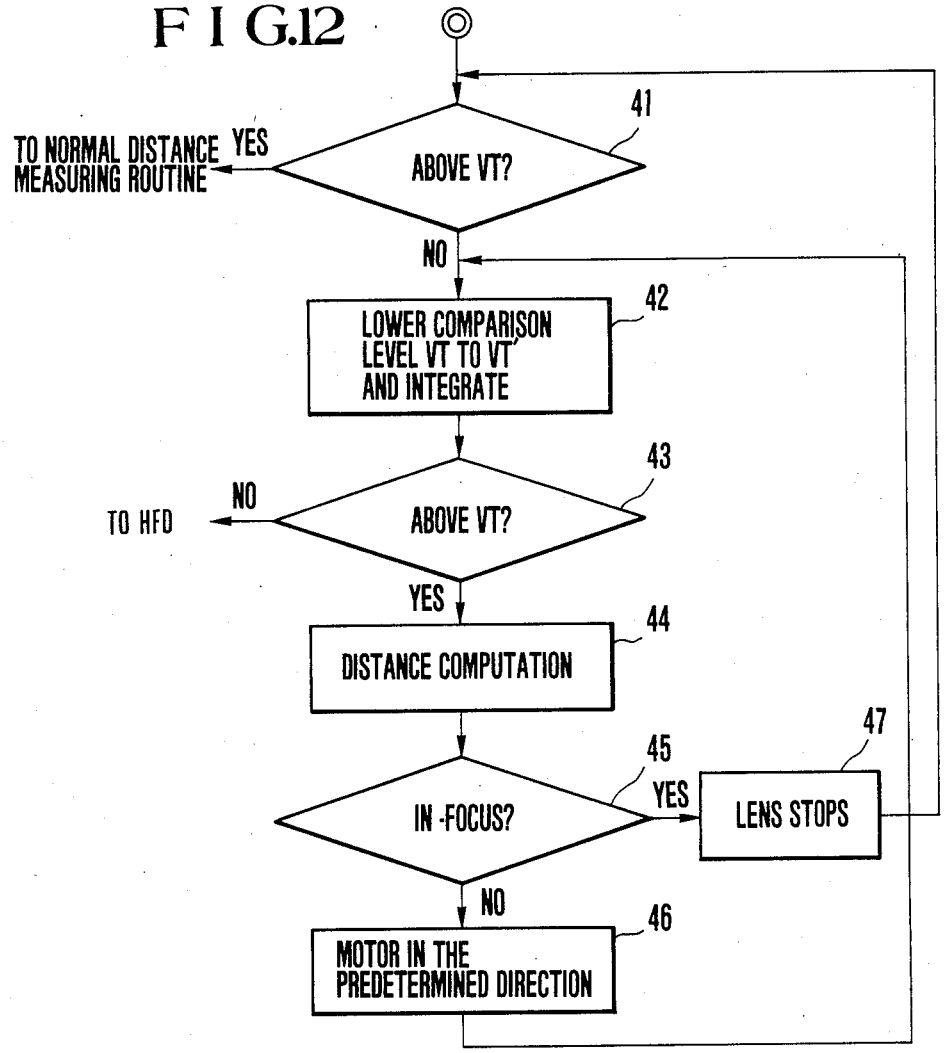
Figure 13:
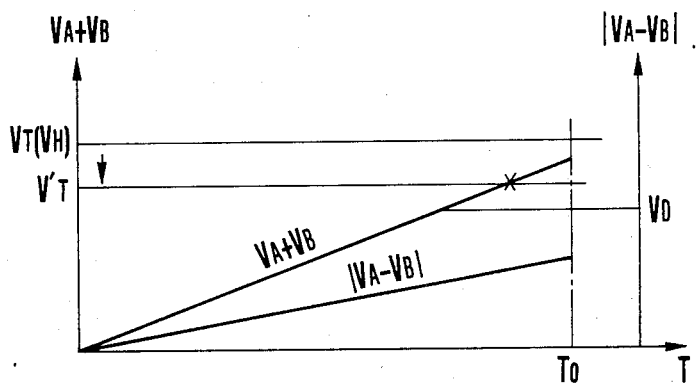

FIGS. 11, 12 and 13 shows an embodiment which is arranged as follows: In a differential, active type automatic focusing device arranged to have rays of light projected from a light projecting element onto an object to be photographed, to have a reflection light of the projected light received by a light receiving element which is divided into two areas and to have the focal point of a lens adjusted according to a distance measured on the basis of the output level of the light receiving element, there is provided comparison level setting means which is arranged to lower the level set for comparison in cases where the reflection light is at a level too low for carrying out the distance measurement.

FIG. 11 shows the embodiment in a block diagram. The differential and active type distance measuring device which is shown in FIG. 6 is used for the automatic focusing device. The same reference numerals are used for denoting the same parts as those shown in FIG. 6. The light from the light projecting element 2 is reflected by an object to be photographed. The reflected light from the object is received by the light receving element 10 which is divided into two areas A and B. The outputs of the areas A and B are processed through the amplification-and-detection circuits 20 and 21 and the integrators 22 and 23 to obtain outputs VA and VB. The adder 24 and the differentiator 25 operate to obtain the values VA+VB and |VA−VB|, which are respectively compared with levels VH and VD at the comparator 26. The microcomputer 27 determines, according to the results of the comparison, whether the lens is in an in-focus position, a near-focus position or a far-focus position. According to the result of determination, an instruction is supplied to the motor driving circuit 28. The circuit 28 drives the motor 29 to move the lens group 1, the light projecting element 2 and the light receiving elemnt 10 in an interlocked manner. With the motor operated in this manner, distance measurement and focal point adjustment are accomplished. In the event that the microcomputer judges that the distance measurement cannot be accomplished due to insufficient reflection light, a comparison level setting ciucuit 40 sends a signal for lowering a comparison level VT to a lower level VT' to the comparison circuit 26 as shown in FIG. 13.

FIG. 12 shows the control operation of the embodiment in a flow chart. In FIG. 12, a reference symbol VT denotes a comparison level which is to be used in determining impossibility of distance measurement due to insufficient reflection light. The comparison level VT corresponds to the comparison level VH which is used for comparison with the value VA+VB in the determining method shown in FIG. 5. The light projected from the light projecting element 2 is reflected by an object to be photographed. The reflection light from the object is received by the light receiving element 10. Then, at a step 41, it is determined whether or not the value VA+VB has reached the above-stated level VT (or VH) after the lapse of the maximum integration time T0 which is shown in FIG. 13. In accordance with the arrangement of the prior art, if the result of this determination is NO, the lens group 1 is moved to a hyper focal distance position. Whereas, in the case of this embodiment, if the result of the determination is NO, the comparison level VT is lowered to a level VT' and the integration process is allowed to be again carried out to a step 42. Upon completion of the second integration process, the value VA+VB is compared with the lowered level VT' at a step 43. In case that the object is not located at a far distance but is located at a near distance and is of a low reflection factor, the value VA+VB can be expected to reach such a level that permits distance measurement.

Accordingly, in case that the result of determination is NO at the step 43, the lens group 1 is shifted to the hyper focal distance (HFD) position. If the result is YES, a distance is computed at a next step 44. An in-focus or out-of-focus state is determined at a step 45. In the event of NO, i.e. in the event of determination as an out-of-focus state, the driving direction of the motor is controlled at a step 46. In case of YES, i.e. determination as an in-focus state, the lens group 1 is stopped in that in-focus position at a step 47.

While an automatic focusing device having the conventional active type distance measuring device is arranged to set the lens in a hyper focal distance focusing position in the event of a distance measurement impossible condition due to an insufficient reflection light, this embodiment is arranged to prevent the probability of having a blurred image of a low-reflection-factor object located at a near distance by virtue of the arrangement to lower the comparison level. The embodiment, therefore, enhances the accuracy of distance measurement.

Figure 14:
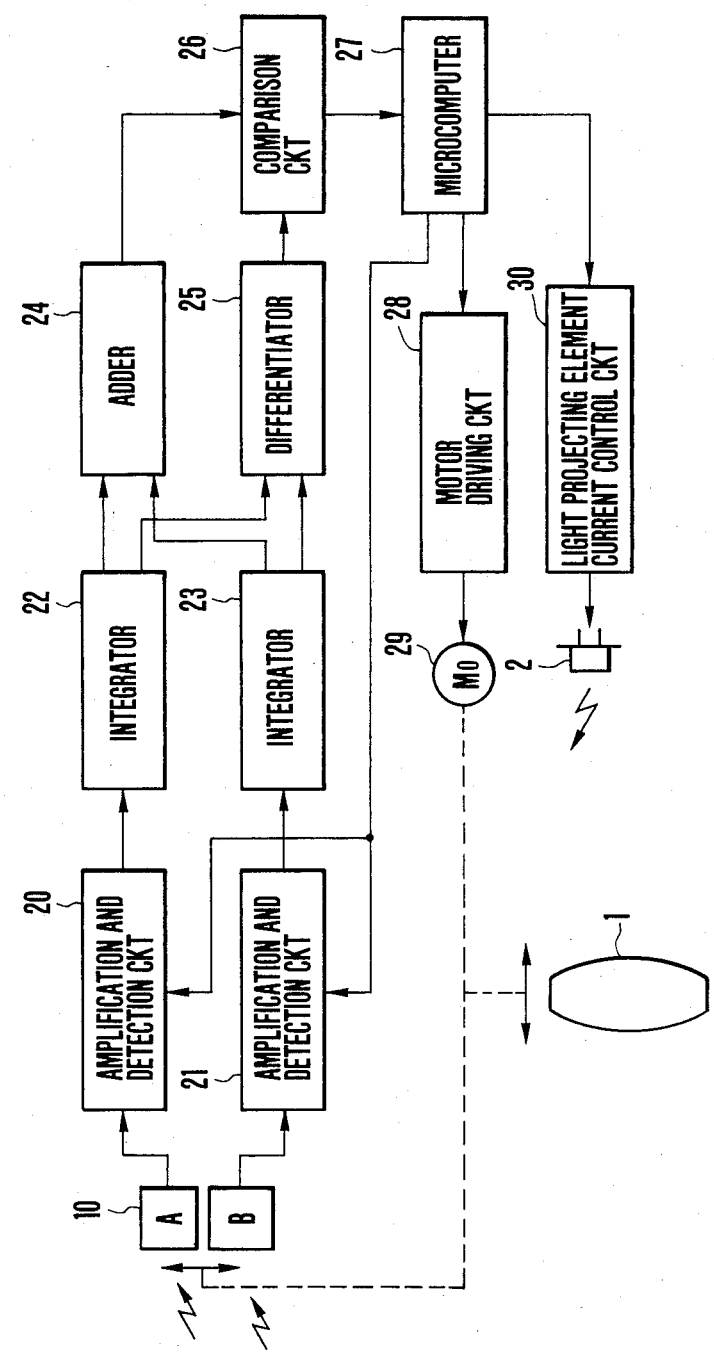
FIGS. 14 and 15 show, as a further embodiment, an automatic focusing device arranged to stop driving a focusing lens in the event of an object of a low reflection factor, FIG. 14 being a block diagram and FIG. 15 a flow chart.
Figure 15:
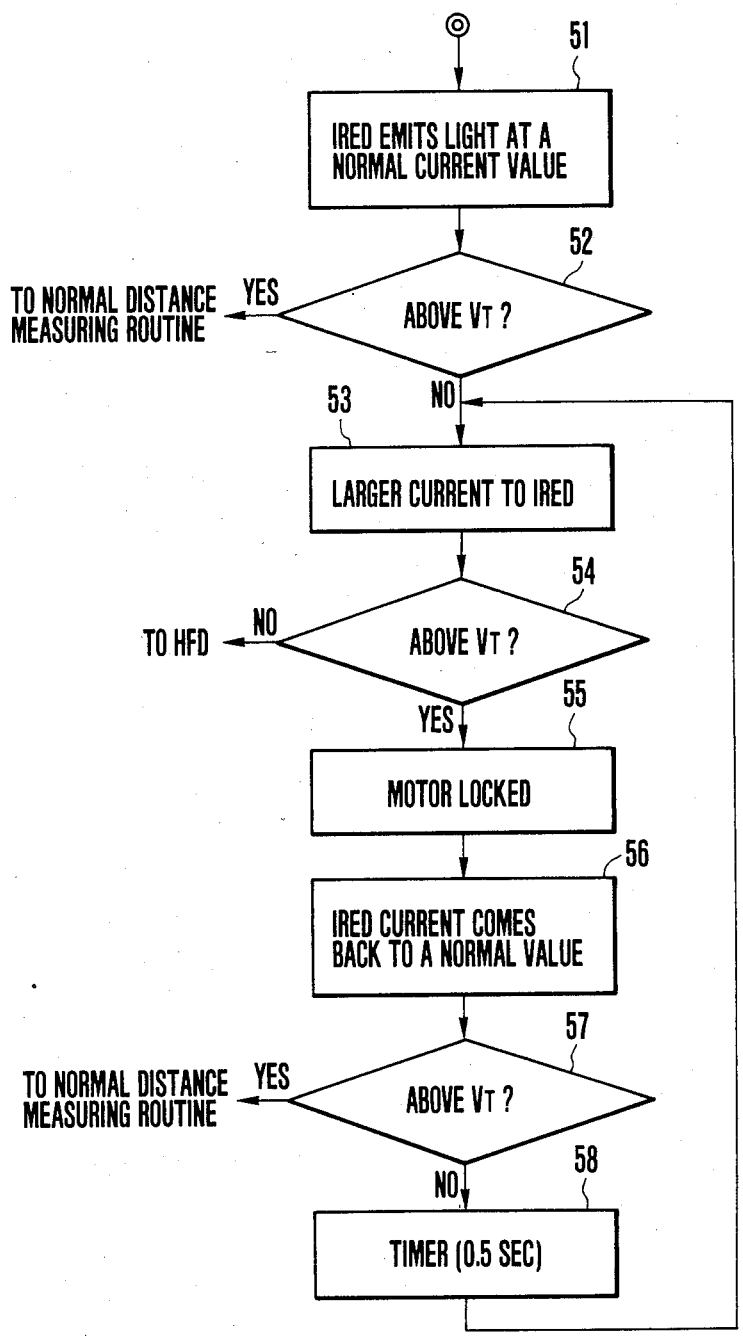

FIGS. 14 and 15 show as a further embodiment of the invention an automatic focusing device having a distance measuring device arranged to make distance measurement by receiving at a light receiving element the quantity of light reflected by an object as a result of light projection by a light projecting element and to control a focusing lens driving operation by means of a distance measurement signal thus obtained. The embodiment is arranged such that: In the event of insufficient level of the reflection light quantity for adequately carrying out distance measurement, the power of light to be projected from the light projecting element is increased. Then, if the object to be photographed is determined to be of a low reflection factor with the power of light increased, a driving operation on the focusing lens is brought to a stop.

FIG. 14 shows in a block diagram the above-stated automatic focusing device having a differential and active type distance measuring device. The same reference numerals and symbols are used for denoting the same parts as those shown in FIG. 6.

The light receiving element 10 is divided into two areas A and B. The outputs of the areas A and B are respectively processed by the amplification-and-detection circuits 20 and 21 and the integrators 22 and 23 to obtain outputs VA and VB. The outputs VA and VB are applied respectively to the adder 24 and the differentiator 25 to obtain output values VA+VB and |VA−VB|, which are then compared with the comparison levels VH and VD at the comparison circuit 26. The microcomputer 27 then determines the results of comparison to be indicating a near-focus state, a far-focus state or an in-focus state. An instruction according to the result of this determination is supplied to the motor driving circuit 28. The circuit 28 then drives the motor 29 to move the lens group 1 and also to move the light receiving element 10 via a cam or the like in association with the movement of the lens group 1. With the lens group 1 and the light receiving element 10 thus moved, distance measurement and focal point adjustment are carried out. Meanwhile, in synchronism with the detection period of the outputs of the light receiving element 10, the light projecting element 2 which consists of an IRED, etc. lights up in a cycle under the control of the microcomputer 27. In addition to this, there is arranged a projecting element current control circuit 30 to control the light emitting power of the light projecting element 2.

FIG. 15 shows the above-stated control operation in a flow chart. Referring to FIG. 15, a reference symbol VT denotes a comparison level to be used for determining an infinity distance position by comparison therewith. This comparison level VT corresponds to ½ of the comparison level VH which is used for comparison with the output value VA+VB in the case of the method shown in FIG. 5. At a step 51, the light projecting element 2 is allowed to emit light at a normal current value and to have the light projected on an object to be photographed. At a step 52, a reflection light resulting from the light projection is received at the light receiving element 10. Then, it is detected whether the quantity of light VA+VB thus received reaches the comparison level VT after the lapse of the maximum integration time T0. In case that the result of the detection is NO, i.e. if the integrated light quantity is below the comparison level VT, it has been impossible by the prior art arrangement to judge whether the low level of the received light quantity VA+VB has resulted from a far distance of the object or from a low reflection factor thereof. While the prior art devices have been arranged to shift the position of the focusing lens group 1 of a photo taking lens to a hyper focal distance focusing position under such a condition, this embodiment of the invention is arranged, at a step 53, to increase the power of light to be projected on the object by increasing a current supplied to the light projecting element 2 to cause it to light up. Following this, the received light quantity level VA+VB is again compared with the level VT at a next step 54. Then, if after the lapse of the max. integration time T0, the level VA+VB still remains below the comparison level VT, i.e. in the event of NO, the low reflection light quantity is considered to be resulting from an excessively far distance of the object and the lens group 1 is shifted to a hyper focal distance focusing position by controlling the motor. However, in case that the level VA+VB is found to have become higher than the comparison level VT, i.e. in the event of YES, the object is determined to be of a low reflection factor instead of to be at a far distance. In that case, the motor 29 is locked and is immediately brought to a stop. The lens group 1 is thus allowed to stay in a focusing position in the neighborhood of the previous distance measurement position in step 55. At a next step 56, concurrently with the issuance of a motor locking instruction, the current supply to the light projecting element 2 is brought back to a normal current value. Then, in the same manner as in step 52, the received light quantity level VA+VB is again determined whether it has reached the level VT after the lapse of the max. integration time T0 at a step 57. If it is then found not having reached the comparison level VT, i.e. in the event of NO, a predetermined length of time counted by a timer (about 0.5 sec) is allowed to lapse at a step 58. After the lapse of this length of time, the operation is brought back to the step 53 of increasing the current supply to the light projecting element 2.

As described above, the conventional automatic focusing device having an active distance measuring device is arranged to judge a low level of reflection light quantity to have resulted from a hyper focal distance of the object to be photographed. Whereas, in the case of this embodiment, the light projecting element lighting current is increased in the event of an occurrence of such a low level of reflection light quantity. Then, if the object is judged to be of a low reflection factor, the focal point adjusting motor is immediately brought to a stop to keep the lens in the distance measurement condition obtained prior to the increase of the light projecting element lighting current. Such being the arrangement of the embodiment, any erroneous operation that results in a blurred picture can be effectively prevented in taking a picture of an object having a low reflection factor. The embodiment, therefore, ensures an excellent focusing performance suited for continuous photographing.

Figure 17:
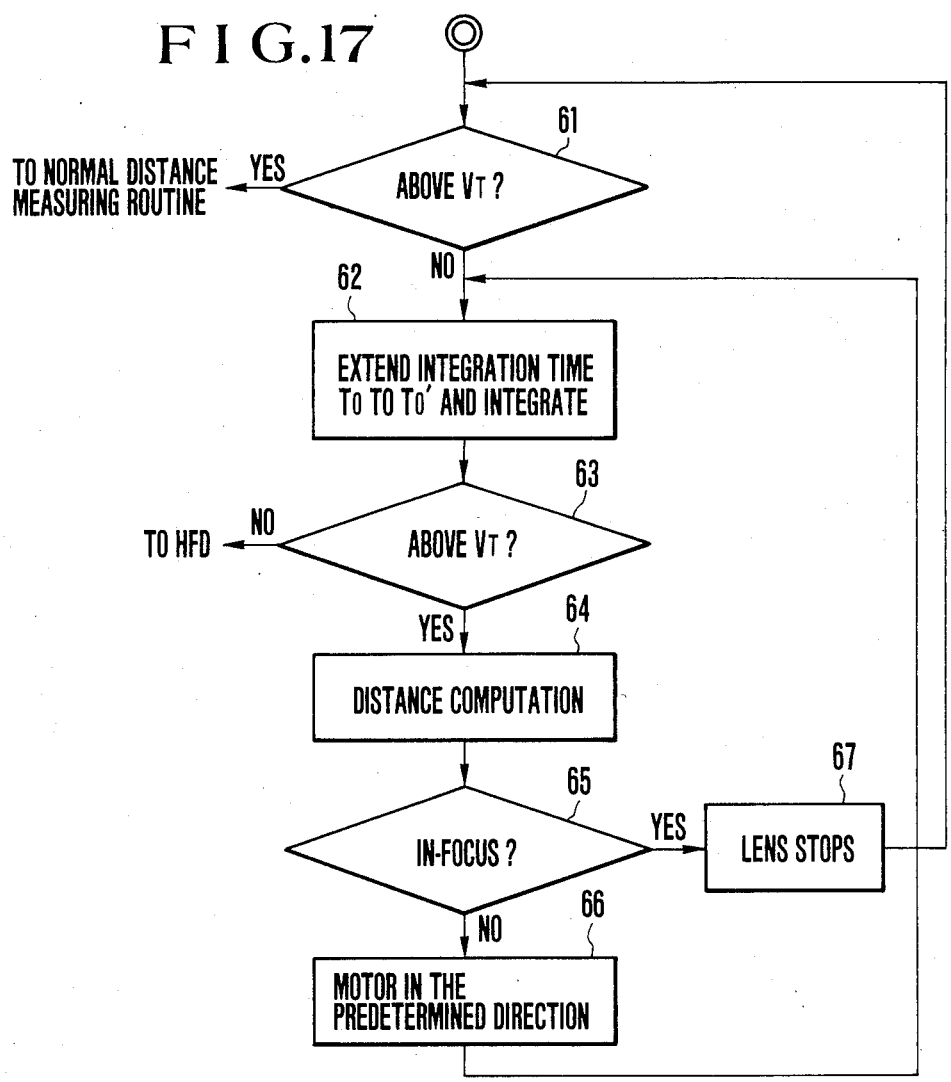
Figure 18:
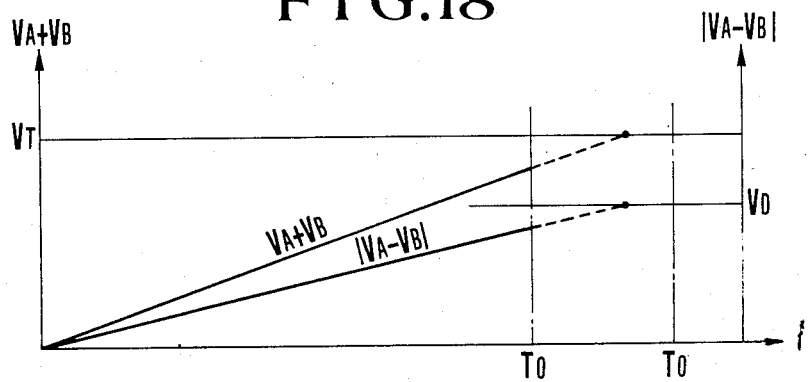
Figure 19:
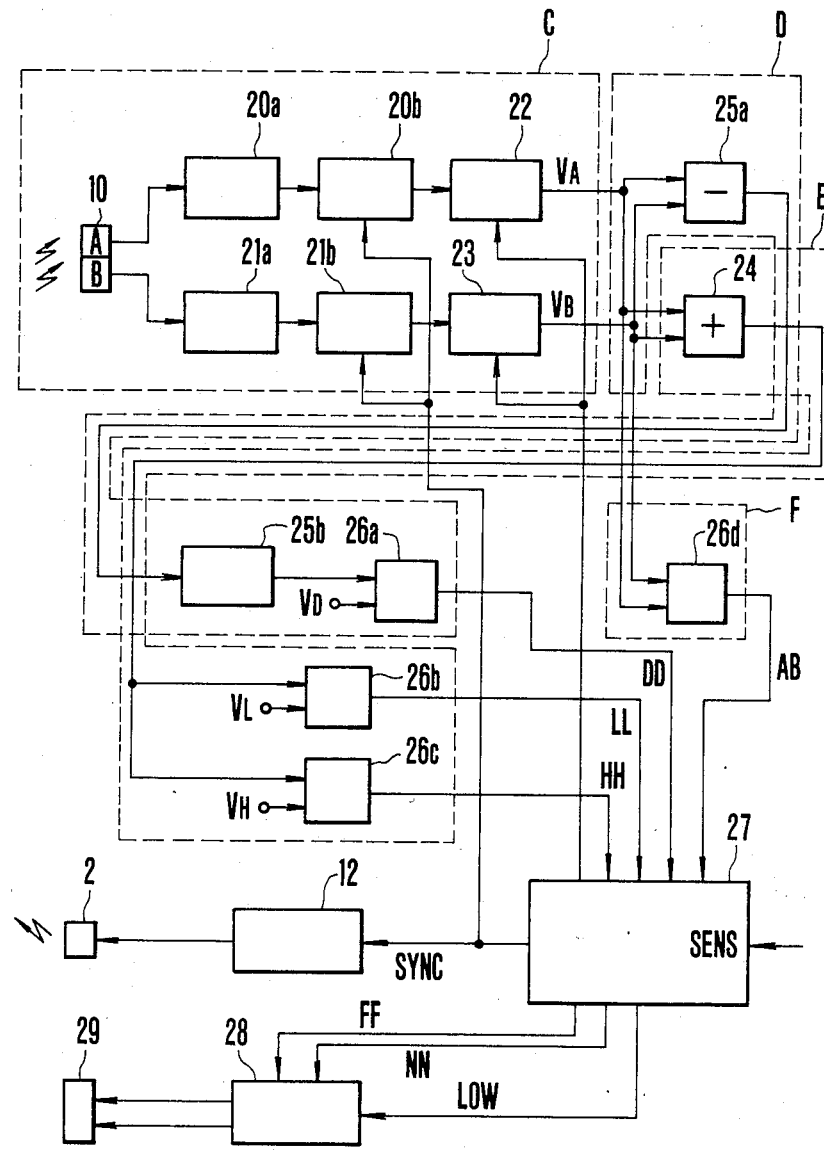
FIGS. 19 to 27 show the details of the amplification-and-detection circuit, the integration circuit, the adder, the differentiator, the comparison circuit and the microcomputer shown in FIGS. 6 and 9.
Figure 20:
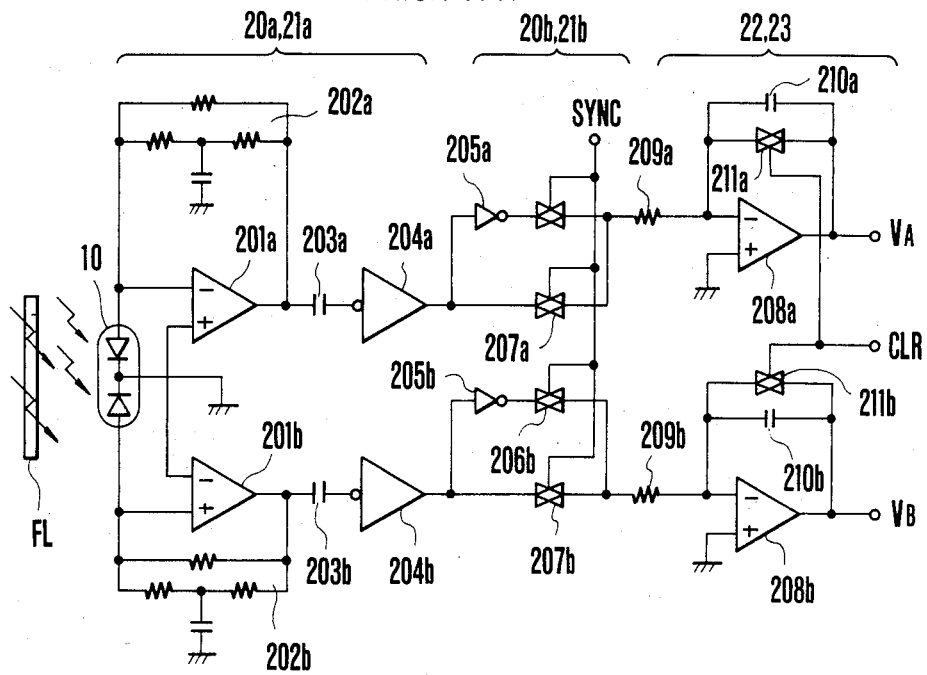
Figure 21:
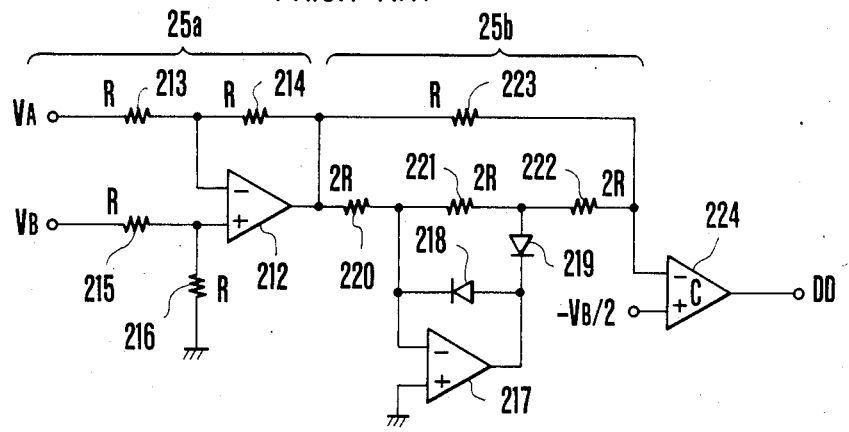
Figure 22:
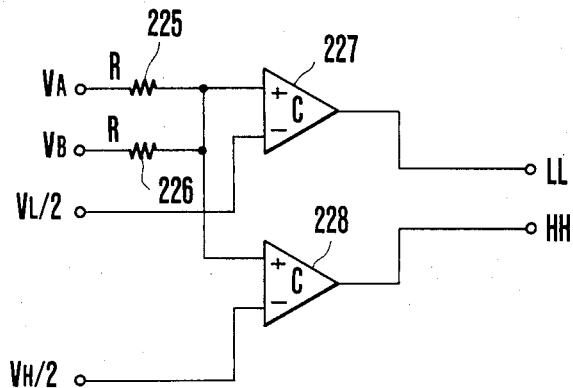
Figure 23:
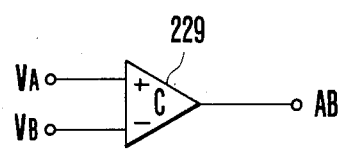
Figure 24:
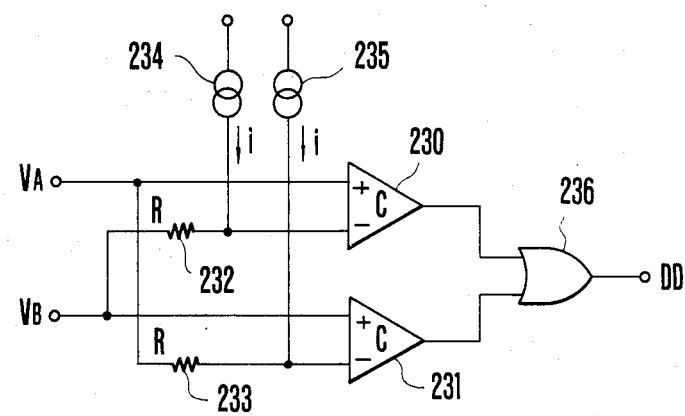
Figure 25:
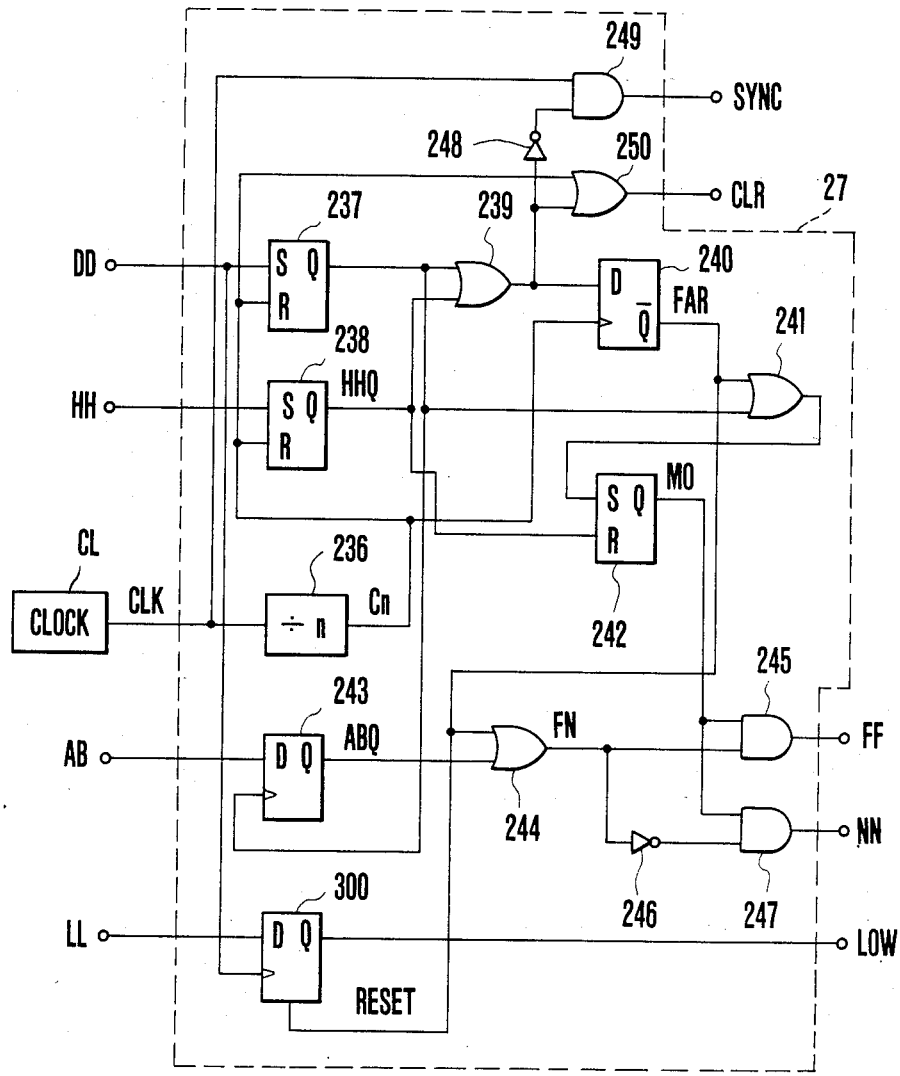
Figure 26:
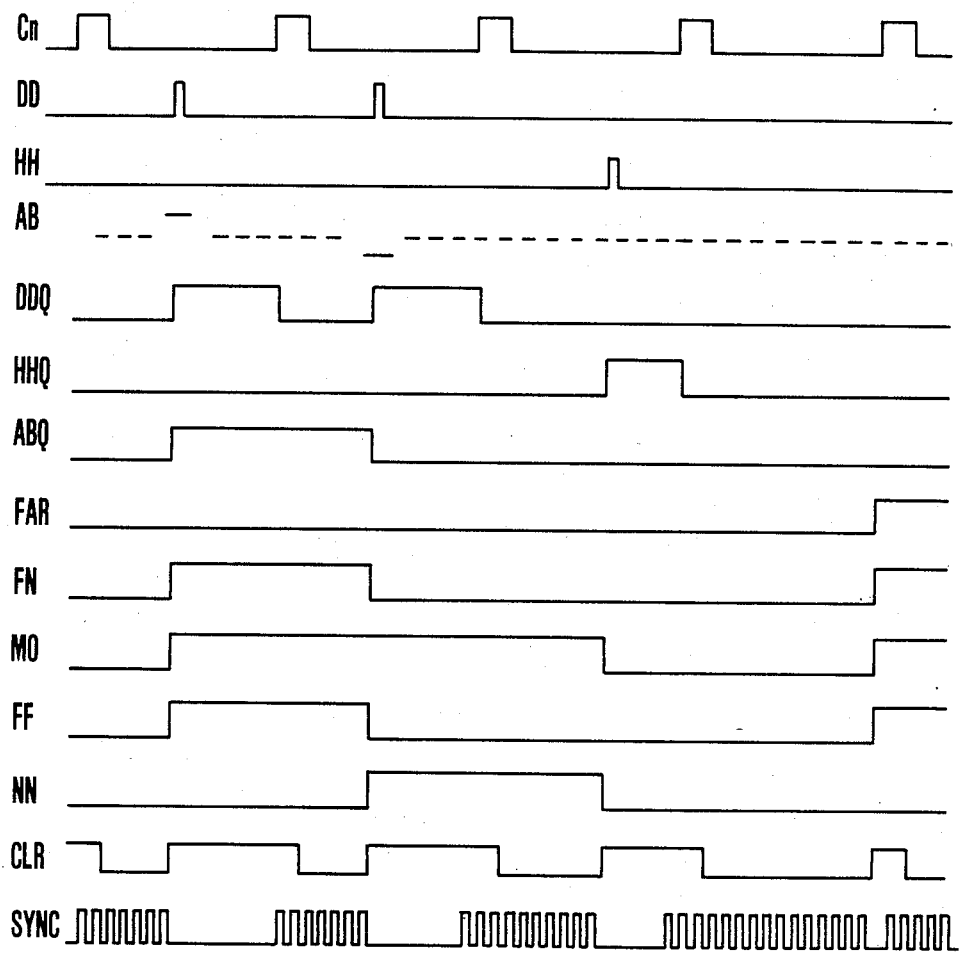
Figure 27:
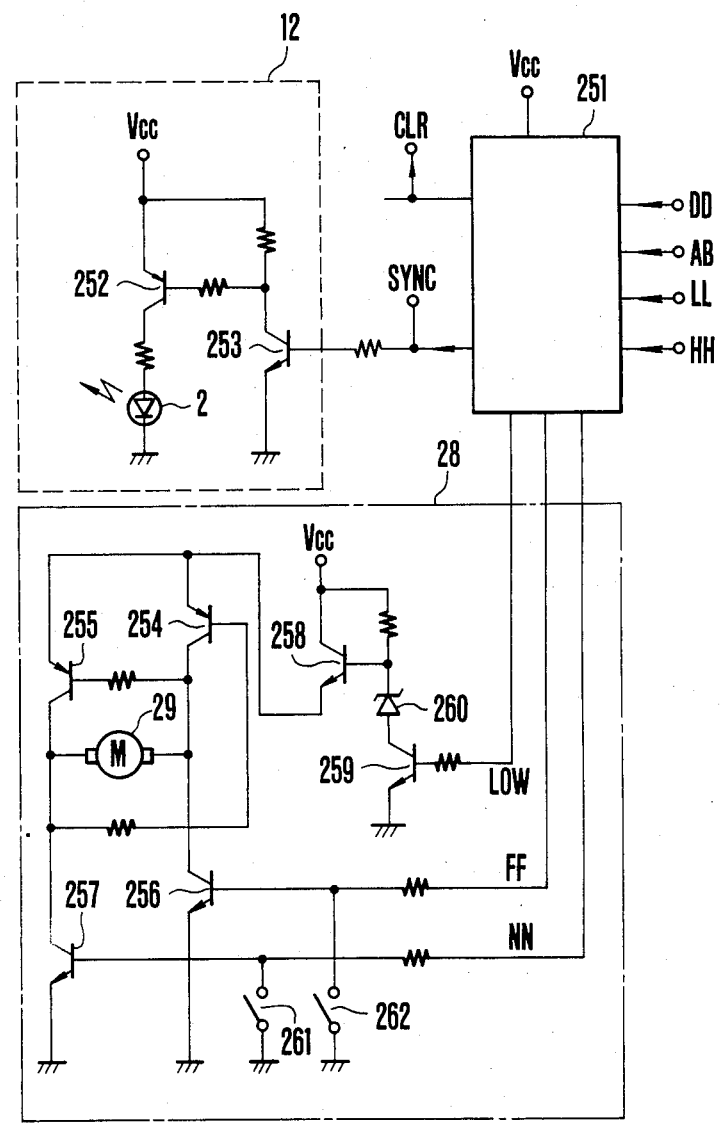

FIGS. 16, 17 and 18 show a still further embodiment of this invention. The embodiment is a differential, active type automatic focusing device arranged to have rays of light projected from a light projecting element onto an object to be photographed; to have a reflection light resulting from this light projection received by a light receiving element which is divided into two areas; and to perform distance measurement and focus adjustment according to the output level of the light receiving element. This device is characterized by the provision of integration time setting means which is arranged to extend the integration time in the event of a reflection light level too low for carrying out distance measurement.

FIG. 16 shows the embodiment in a block diagram. The same reference numerals and symbols are used for denoting the same parts as those shown in FIG. 6. The light receiving element 10 is divided into two areas A and B. The outputs of these areas A and B are respectively processed by the amplification and detection circuits 20 and 21 and the integrators 22 and 23 to obtain outputs VA and VB. The adder 24 and the differentiator 25 respectively perform operations on these outputs to obtain values VA+VB and |VA−VB|. These values are then compared with set levels VH and VD respectively at the comparison circuit 26. On the basis of the results of the comparison, the microcomputer 27 determines an in-focus state, a near-focus state or a far-focus state. An instruction according to the determination is sent to the motor driving circuit 28. The circuit 28 drives the motor 29 to move the lens group 1, the light projecting element 2 and the light receiving element 10 for focus adjustment. In cases where the microcomputer judges that the distance measurement is impossible for insufficiency of the reflection light quantity, the integration time setting circuit 60 supplies the integrators 22 and 23 with a signal for extending the max. integration time T0 to a longer time T0' in a manner as shown in FIG. 18.

FIG. 17 shows the control operation of this embodiment in a flow chart. In FIG. 17, a reference symbol VT denotes a comparison level to be used for determining that the distance measurement is impossible for insufficiency of the reflection light. This comparison level VT corresponds to the comparison level VH which is used for comparison with the value VA+VB in the case of the method shown in FIG. 5. A reflection light which comes from the object as a result of light projection by the light projecting element 2 is received by the light receiving element 10. Then, at a step 61, it is determined whether the value VA+VB has reached the comparison level VT (or VH) after the lapse of a max. integration time T0 shown in FIG. 18. If the result of the determination or judgement is NO, the max. integration time T0 is extended to a longer time T0' and an integration process is allowed to be repeated at a step 62. Whereas, in the conventional arrangement, the lens group 1 is merely shifted to a hyper focal distance focusing position when the result of determination made at the step 61 is NO. With the integration process thus having been repeated at the step 62, the newly integrated value VA+VB is again compared with the comparison level VT at a step 63. If it is thus found that the object is not located at an excessively far distance but is of a low reflection factor, the integrated reflection light quantity can be expected to eventually reach a level which permits distance measurement as indicated by broken lines in FIG. 18.

Therefore, when the result of the second judgement made at the step 63 is NO, the lens group 1 is shifted to a hyper focal distance focusing position. If the result is YES, distance computation is performed at a step 64. Then, the motor is driven and the lens group 1 is determined as to whether it is in an in-focus position at a step 65. If the result of this is NO, the driving direction of the motor is controlled at a step 66. In the event of YES, the lens group 1 is stopped in the in-focus position at a step 67.

In the event of a distance measurement impossible condition because of an insufficient reflection light quantity, the conventional automatic focusing device having an active type distance measuring device is arranged to merely set the focusing lens group in a hyper focal distance focusing position. Whereas, as mentioned above, this embodiment of the invention is arranged to extend the maximum integration time in that event. This arrangement effectively prevents taking a blurred or out-of-focus picture of a low reflection factor object located at a near distance.

What is claimed is:

1. An automatic focusing device for a camera comprising:
    a focus adjusting lens;
    driving means for driving said lens;
    light projecting means for projecting a distance measuring light toward an object to be photographed;
    light receiving means having two light receiving areas, said means being arranged to convert the quantitites of light received by said light receiving areas into electrical signals respectively;
    comparison means arranged to obtain the sum of and a difference between said electrical signals produced from said two light receiving areas and to compare said sum or said difference of said signals with a comparison signal; and means to enable operator in accordance with the following steps:
    (a) emitting a normal amount of light from said light projecting means;
    (b) receiving the reflection of the ordinary amount of light from an object to be photographed by said light receiving means and integrating a light receiving signal within a prescribed time;
    (c) performing a first comparison by the output signal based on said integrating step;
    (d) increasing the amount of light emitting from said lighting projecting means on the basis of the comparison result of said first comparing step;
    (e) detecting the in-focus state with light received under said increased amount of emitting light; and
    (f) returning the increased light amount of said light projecting means to the normal light amount after the end of said in-focus state detecting step.

2. An automatic focusing device for a camera comprising:
    a focus adjusting lens;
    driving means for driving said lens;
    light projecting means for projecting a distance measuring light toward an object to be photographed;
    light receiving means having two light receiving areas, said light receiving means being arranged to convert the quantities of light received by said light receiving areas into electrical signals;
    comparison means arranged to obtain the sum of and a difference between said electrical signals produced from said two light receiving areas and to compare said sum or said difference of said signals with a comparison signal; and means to enable operation in accordance with the following steps:
    (a) integrating electrical signals from said light receiving means within a prescribed time and comparing said integrated signal with a first comparison signal by said comparison means;
    (b) lowering the reference level of said first comparison signal to a second comparison signal when said integrated signal does not reach said first comparison signal within said prescribed time and comparing said integrated signal with said second comparison signal;
    (c) performing an in-focus detecting operation on the basis of the output of said comparison means by said second comparison signal and controlling said focus adjusting means to an in-focus position; and
    (d) returning the reference level of said comparison means from said second comparison signal level to said first comparison signal level so that an integrated signal within the next prescribed time will be compared with said first comparison signal level.

3. An automatic focusing device for a camera comprising:
    a focus adjusting lens;
    driving means for driving said lens;
    light projecting means for projecting a distance measuring light toward an object to be photographed;
    light receiving means having two light receiving areas, said light receiving means being arranged to convert the quantities of light received by said light receiving areas into electrical signals;
    integrating means for integrating the signals produced from said light receiving means;
    means for obtaining signals respectively representing the sum of and a difference between the signals which are produced from said light receiving areas and integrated by said integrating means;
    comparison means arranged to obtain said sum signal and said difference signal and to compare these signals with comparison signals respectively; and means to enable operation in accordance with the following steps:
    (a) comparing the integrated signal of said light receiving means within a first predetermined integration time of said integrating means with said comparison signal, whereby when the magnitude of the integrated signal does not reach a prescribed value, the comparing operation is performed within a longer or second integration time than said first integration time;

(b) performing an in-focus detecting operation on the basis of the comparison output of said comparison means by the integration signal within said second integration time and controlling said focus adjusting means to an in-focus position; and (c) returning the integration time of said integrating means from the second integration time to the first integration time so that the next comparison operation will be performed by an integrated signal as obtained from the output of said light receiving means within said first integration time.

* * * * *